(12) United States Patent
Krenzer

(10) Patent No.: US 9,833,843 B2
(45) Date of Patent: Dec. 5, 2017

(54) DRILL

(71) Applicant: Mapal Fabrik für Präzisionswerkzeuge Dr. Kress KG, Aalen (DE)

(72) Inventor: Ulrich Krenzer, Zirndorf (DE)

(73) Assignee: MAPAL FABRIK FUR PRAZISIONSWERKZEUGE DR. KRESS KG, Aalen (DE)

( * ) Notice: Subject to any disclaimer, the term of this patent is extended or adjusted under 35 U.S.C. 154(b) by 126 days.

(21) Appl. No.: 14/387,577

(22) PCT Filed: Mar. 20, 2013

(86) PCT No.: PCT/EP2013/055796
§ 371 (c)(1),
(2) Date: Sep. 24, 2014

(87) PCT Pub. No.: WO2013/143936
PCT Pub. Date: Oct. 3, 2013

(65) Prior Publication Data
US 2015/0093205 A1    Apr. 2, 2015

(30) Foreign Application Priority Data

Mar. 26, 2012   (DE) .................. 10 2012 005 919
Jun. 22, 2012   (DE) .................. 10 2012 012 479

(51) Int. Cl.
*B23B 51/02*   (2006.01)
*B23B 51/00*   (2006.01)
*B23B 51/10*   (2006.01)

(52) U.S. Cl.
CPC .......... *B23B 51/009* (2013.01); *B23B 51/108* (2013.01); *B23B 51/02* (2013.01);
(Continued)

(58) Field of Classification Search
CPC .......... B23B 2251/48; B23B 2251/606; B23B 2251/085; B23B 2251/14; B23B 2251/18;
(Continued)

(56) References Cited

U.S. PATENT DOCUMENTS 867,639 A * 10/1907 Bragg ................... B23B 51/048
407/24
1,407,546 A * 2/1922 Joseph .................... B23B 51/02
408/223

(Continued)

FOREIGN PATENT DOCUMENTS

DE   8912860 U1   2/1990
DE   29901414 U1   8/1999

(Continued)

OTHER PUBLICATIONS

International Search Report and Written Opinion of the ISA for PCT/EP2013/055796, ISA/EP, dated Jun. 5, 2013.

(Continued)

*Primary Examiner* — Daniel Howell
*Assistant Examiner* — Yasir Diab
(74) *Attorney, Agent, or Firm* — Stephen T. Olson; Harness, Dickey & Pierce, P.L.C.

(57) ABSTRACT

A drill bit has a tool shank, a center axis, a first cutting region with at least one geometrically defined first cutting edge, the same having a cutting face arranged at a radial distance from the center axis of the drill bit. The first cutting edge forms a countersink angle with the center axis. The drill bit having a chip shaping stage functionally assigned to the first cutting edge formed by the cutting face of the first cutting edge and by a shoulder surface adjoining the cutting face and forming a shoulder angle with the same, wherein the shoulder angle is greater than 90°, and preferably greater than 100°. The cutting face runs at a radial rake angle with respect to an (Continued)

imaginary radial line which cuts the first cutting edge, the same functionally assigned to the cutting face. The radial rake angle is positive.

16 Claims, 4 Drawing Sheets

(52) U.S. Cl.
CPC ........... *B23B 51/10* (2013.01); *B23B 2251/04* (2013.01); *B23B 2251/14* (2013.01); *B23B 2251/204* (2013.01); *B23B 2251/406* (2013.01); *B23B 2251/48* (2013.01); *Y10T 408/03* (2015.01); *Y10T 408/906* (2015.01); *Y10T 408/9097* (2015.01)

(58) Field of Classification Search
CPC ... B23B 2251/54; B23B 51/10; B23B 51/107; B23B 51/108; B23B 51/009; B23B 51/02
See application file for complete search history.

(56) References Cited

U.S. PATENT DOCUMENTS

| | | | |
|---|---|---|---|
| 1,747,117 A | | 2/1930 | Klein |
| 2,389,909 A | * | 11/1945 | Hofbauer ............ B23B 51/0081 408/223 |
| 2,769,355 A | * | 11/1956 | Crisp ..................... B23B 51/02 408/230 |
| 4,580,933 A | | 4/1986 | Wilkins |
| 4,975,003 A | * | 12/1990 | Hosoi ..................... B23B 51/02 408/227 |
| 5,186,584 A | | 2/1993 | Muller et al. |
| 8,550,756 B2 | * | 10/2013 | Borschert ............... B23B 51/02 408/230 |
| 2010/0254779 A1 | * | 10/2010 | Wedner ................. B23B 51/009 408/224 |
| 2011/0170973 A1 | * | 7/2011 | Von Puttkamer ....... B23B 51/02 408/230 |
| 2012/0051863 A1 | * | 3/2012 | Craig ..................... B23B 51/08 408/1 R |

FOREIGN PATENT DOCUMENTS

| | | | |
|---|---|---|---|
| EP | 2239075 A2 | | 10/2010 |
| FR | 2552694 A1 | | 4/1985 |
| JP | 62208809 A | * | 9/1987 |
| JP | 63102814 A | * | 5/1988 |
| JP | H10-29107 A | | 2/1998 |
| JP | 2001-105216 A | | 4/2001 |
| JP | 2011-93059 A | | 5/2011 |

OTHER PUBLICATIONS

English Translation of International Preliminary Report on Patentability regarding International Application No. PCT/EP2013/055796 dated Oct. 1, 2014 and Written Opinion of the International Searching Authority.
Office Action regarding European Application No. 13 711 039.1-1709, dated Sep. 10, 2015 (machine translation provided).
Leopold Sauer, Tools for the Automated Internal and External Machining, Vogel-Verlag, Wurzburg, 1975.
Notice of Reasons for Rejection regarding Japanese Patent Application No. 2015-502214 dated Jul. 19, 2016. Translation provided by Gleiss & Grosse.

* cited by examiner

DRILL

CROSS-REFERENCE TO RELATED APPLICATIONS

This application is a 371 U.S. National Stage of International Application No. PCT/EP2013/055796, filed Mar. 20, 2013, which claims priority to German Patent Applications Nos. 10 2012 005 919.1, filed Mar. 26, 2012 and 10 2012 012 479.1, filed Jun. 22, 2012. The entire disclosures of the above applications are incorporated by reference herein.

FIELD

The invention relates to a drill bit according to the preamble of claim 1, and also to the use of such a drill bit according to claim 13.

BACKGROUND

When materials are machined by means of a drill bit claimed herein, the chip formation is generally controllable during drilling, even in the case of long-chipping materials. The chips are broken into short segments and safely transported as individual helical chips away from the cutting edge of the drill bit. In counterbore applications, long ribbon chips are usually formed when long-chipping materials are machined, frequently wrapping around the tool and making further use thereof impossible. In this case, there is a risk that the drill bit will break off and the work piece will be damaged. In order to prevent the formation of such chips, the advancement of the drill bit is briefly halted or reversed in many cases during the machining of a work piece. However, this leads to longer machining times, and to increased wear as a result of the alternating loads on the drill bit. If the drill bit is designed as a step drill bit—that is, a combination of a solid drill bit and a counterbore bit in a single tool, the chips milled out by the solid bit cutting edges and the counterbore bit cutting edges frequently foul in each other and form a ball, which frequently leads to the tool breaking or to damage to the cutting edges.

SUMMARY

The problem addressed by the invention is therefore that of creating a drill bit of the type claimed above, wherein the formation of long chips, or the formation of balls of chips, is prevented to the greatest degree possible, even in the machining sof long-chipping materials.

To address this problem, a drill bit having the features of claim 1 is proposed. This drill bit has a tool shank with a first cutting region having at least one geometrically defined first cutting edge with an associated cutting face, said tool shank forming a countersink angle with a center axis of the drill bit. The drill bit is characterized in that a chip shaping stage is functionally assigned to the first cutting edge, preventing the formation of long chips and the creation of balls of chips. The chip shaping stage is formed by the cutting face of the first cutting edge, and by a shoulder surface adjoining the cutting face and forming a shoulder angle with the cutting face. The shoulder face in this case is arranged at an acute angle of inclination with respect to the center axis, said angle of inclination being greater than 90°, and preferably greater than 100°, such that chips milled off by the first cutting edge are deflected by the chip shaping stage in the direction of the center axis of the drill bit. In addition, the drill bit is also characterized in that the rake angle of the cutting face, measured orthogonal to the major cutting edge of the first cutting edge, is positive. This leads to a reduction in the cutting forces.

An embodiment of the drill bit is particularly preferred wherein the angle of inclination of the shoulder surface of the chip shaping stage is configured to be in a range from −10° to +10°, and preferably from −5° to +5°.

A further preferred embodiment is characterized in that the shoulder angle is configured to be greater in inverse proportion to the countersink angle. In this manner, it is easy to influence the size and shape of the chips created during the machining of a work piece. In particular, it is possible to prevent long chips and the formation of balls.

One particularly preferred embodiment is characterized in that a second cutting region is included, having at least one geometrically defined second cutting edge, such that the drill bit can be used as a step drill bit or counterbore bit. In this case, the second cutting region is arranged on the end face of the drill bit, and the first cutting region is arranged at a distance therefrom axially—measured along the center axis. In this case, the machining diameter of the second cutting region is smaller than that of the first cutting region. In such an embodiment as well, the chip shaping stage ensures that long chips and chip balls are prevented even when long-chipping work pieces are machined.

Additional embodiments are found in the dependent claims.

The problem is also addressed by the use of such a drill bit as a stepped bore or counterbore tool.

BEST DESCRIPTION OF THE DRAWINGS

The invention is described in greater detail below with reference to the drawings, wherein.

DETAILED DESCRIPTION

Figure 1:
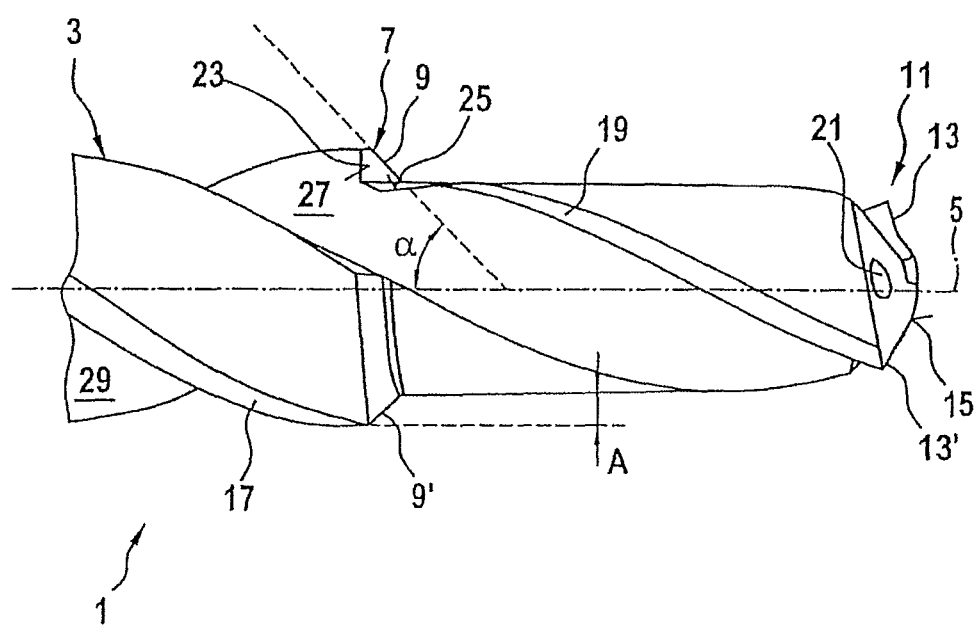
FIG. 1 shows a first embodiment of a drill bit in a side view.

FIG. 1 illustrates a first embodiment of a drill bit 1—particularly the front end region thereof. It has a tool shank 3 which is broken off on its left end. It can be coupled to a holder directly, or via a known holder shaft, in the conventional manner. A relative rotation occurs between the work piece and the drill bit when the drill bit is operated—that is, during the machining of a work piece. The drill bit 1 is typically coupled to a tool spindle which also serves as a holder—either directly or via intermediate elements, said tool spindle being made to rotate such that the rotating drill bit 1 can be brought into engagement with a fixed work piece in order to produce a bored hole or counterbore the same, and/or to create a stepped bore hole. The drill bit 1 rotates about its center axis 5 during the machining of the work piece.

The drill bit 1 illustrated in FIG. 1 has a first cutting region 7 with at least one geometrically defined first cutting edge 9, which is arranged at a distance from the center axis 5 radially, thereby defining a flight circle of the first cutting edge 9, and therefore a machining diameter of a bore hole.

The drill bit 1 according to FIG. 1 has a second cutting region 11 which likewise has at least one geometrically defined second cutting edge 13. The radial distance of the second cutting edge 13 from the center axis 5 is less than the radial distance of the first cutting edge 9, such that there is a smaller machining diameter in the second cutting region 11 than is produced in the first cutting region 7.

FIG. 1 shows that the second cutting region 11 is arranged on the end face 15 of the drill bit 1, and the first cutting region 7 is arranged at a distance therefrom axially—measured along the center axis 5.

If the drill bit 1 illustrated in FIG. 1 is used to machine a work piece, the second cutting region 11 makes the first engagement with the work piece, on the end face 15 of the drill bit. Upon a further advancement of the drill bit 1 in the direction of the center axis 5, the first cutting region 7 also comes into engagement with the work piece, such that the bore hole produced by the second cutting region 11 is machined by the first cutting region 7. The bore hole produced by the second cutting region 11 is counter bored by the first cutting region 7, which—as stated above—has a greater machining diameter.

The second cutting region 11 on the end face 15 of the drill bit can be designed in such a manner that the drill bit 1 can be used to drill in solid material. However, it can also be contemplated that an existing bore hole is counter bored by means of the second cutting region 11, and a further enlargement of the inner diameter of the bore hole is achieved by means of the first cutting region 7. If the drill bit 1 is guided completely through a work piece, both the second cutting region 1 and the first cutting region 7 therefore engage over the entire length of a bore hole in a work piece. As such, a counterbore of a bore hole in a work piece is realized by means of the drill bit 1 illustrated here.

However, it can also be contemplated that the drill bit 1 is made to rotate about its center axis 5 and to machine a work piece without the drill bit 1 being guided fully through the same. In this way, a bore hole with a first diameter is produced or machined by means of the second cutting region 11, and this bore hole is counter bored by means of the first cutting region 7, such that a segment of the bore hole is created which has a greater internal diameter than is found in the bore hole region which has been machined by means of the second cutting region 11. In this case, the drill bit 1 is used as a stepped drill bit.

When a bore hole is machined, the drill bit 1 is supported via at least one guide bevel. In the embodiment illustrated here, a first guide bevel 17 is included, connecting to the first cutting region 7, and a second guide bevel 19 is included for the second cutting region 11. At least one guide bevel is preferably included for each cutting edge included in the cutting regions, wherein the drill bit 1 is supported on the inner surface of a bore hole via said guide bevel.

In order to increase the machining speed, and in order to better distribute cutting forces developed in the drill bit 1, two paired cutting edges, arranged opposite each other, are configured in each of the first cutting region 7 and the second cutting region 11. A first cutting edge 9 can be seen in FIG. 1 at top, in the first cutting region 7, to which a cutting edge 9' with an identical design opposite and below the center line 5 is functionally assigned.

Accordingly, an identical cutting edge 13' is configured diametrically opposite the second cutting edge 13, in the second cutting region 11.

Because the two opposed cutting edges in the first and the second cutting regions have identical designs, the text only addresses one of these in each case below.

FIG. 1 also shows that the drill bit 1 preferably has a cooling means/lubricant feed, and that at least one opening 21 is configured in the end face 15 of the drill bit 1, wherein the cooling means/lubricant can exit from the same. A further opening is preferably included diametrically opposite the opening 21. The number of the openings is preferably matched to the number of the cutting edges in each cutting region.

The side view depicted in FIG. 1 shows that the first cutting edge 9 has a cutting face 23, wherein chips milled out by the cutting edge 9 run off of the same. A surface 25 runs at an angle and connects to the cutting face 23. In the conventional fashion, the first cutting edge 9 has a cutting edge segment—the major cutting edge—which in FIG. 1 is oriented facing right—that is, in the direction in which the bit advances—as well as a cutting edge segment—the minor cutting edge—which faces outward radially with respect to the center axis 5—that is, along the periphery. Chips milled out by these two cutting edge segments run off of the same and onto the cutting face 23.

Chips milled out by the first cutting edge 9 move into a first chip flute 27 and are transported out of the first cutting region 7 via the same. The same chip flute also guides away chips which are milled out of a work piece by the second cutting edge 13'.

Accordingly, chips which are milled out by the first cutting edge 9' opposite the first cutting edge 9 are guided out of the machining site via a second chip flute 29, and this also guides away chips which are milled out by the second cutting edge 13.

It can be seen that the chip flutes 27 and 29 in the embodiment of the drill bit 1 illustrated here each guide away chips which are milled out by the cutting edges 9, 9' or 13, 13' of the first and second cutting regions 7 or 11, as the case may be.

The illustration chosen here makes it clear that the first cutting edge 9, like the opposite cutting edge 9', forms an angle with the center axis 5—indicated as countersink angle $\alpha$ as well. It can be seen that a bore hole in a work piece, which is machined or produced by means of the second cutting region 11 during the machining of a work piece, is enlarged by the radial depth of cut A—that is, up to the size of a segment which results from the fact that the radial distance of the first cutting edge 9 with respect to the center axis 5 is greater than the radial distance of the second cutting edge 13 with respect to the center axis 5.

FIG. 2 again shows the first embodiment of the drill bit 1 in a significantly enlarged side view. However, this view is rotated with respect to the illustration in FIG. 1, such that the first cutting edge 9 of the first cutting region 7 now faces the observer.

Below, identical and functionally-identical parts are indicated by the same reference numbers, such that attention is hereby directed to the description referring to FIG. 1 in order to avoid repetition.

Figure 2:
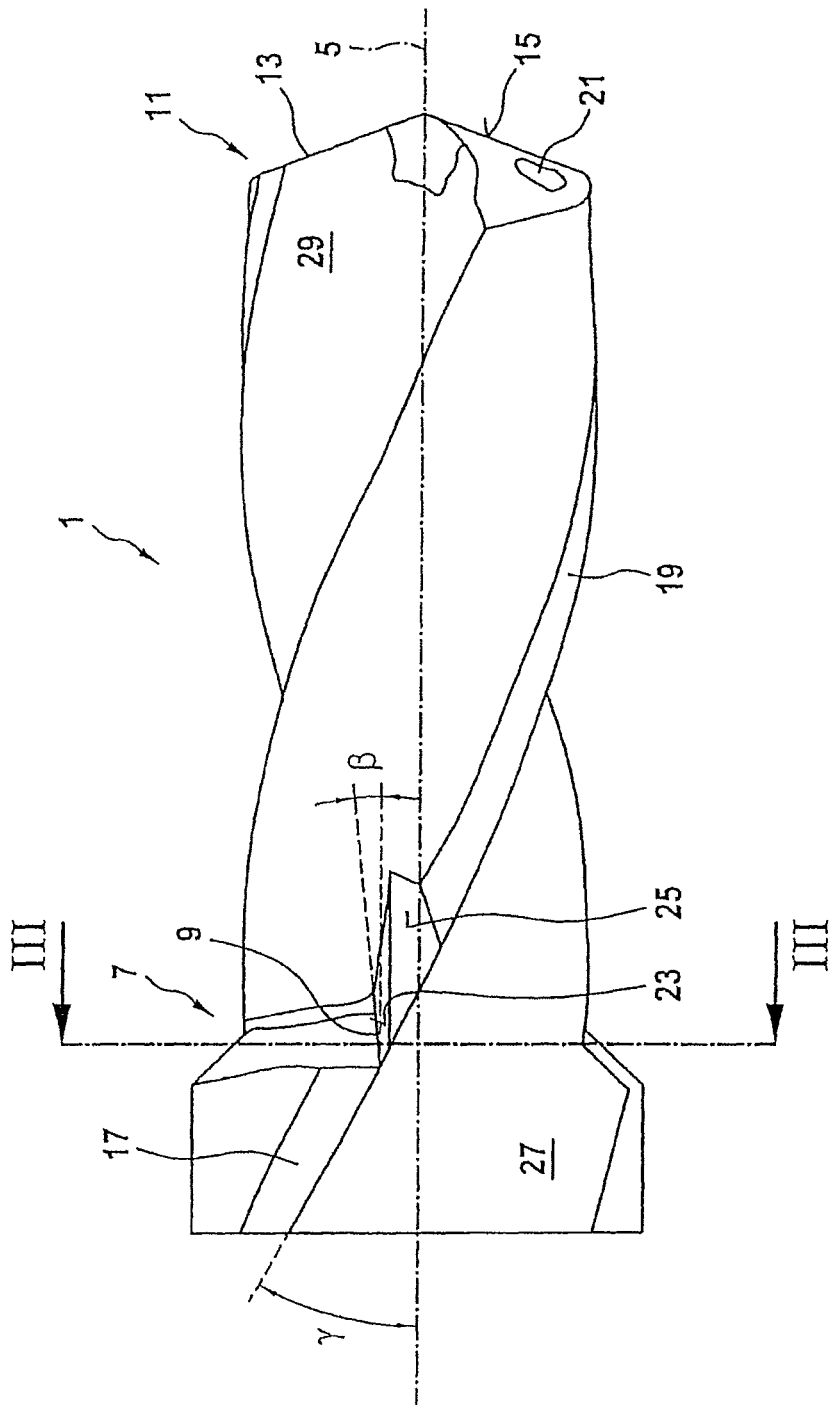
FIG. 2 shows the drill bit according to FIG. 1 in a significantly enlarged second side view.

In FIG. 2 as well, the cutting face 23 of the first cutting edge 9 can be seen, as well as the adjoining surface 25 which forms an angle with the cutting face 23.

Chips milled out by the first cutting edge 9 of the first cutting region are removed via the cutting face 23 and move into the associated chip flute 27 also receives chips which are milled out of a work piece by the second cutting edge 13' of the second cutting region 11. Accordingly, the chip flute 29 receives the chips from the first cutting edge 9' and the second cutting edge 13, as mentioned above.

It can be seen in FIG. 2 that the cutting face 23 proceeding from the first cutting edge 1 is arranged at an angle with respect to the center axis 5, said angle indicated as the axial rake angle $\beta$. It is clear that the cutting face 23 in this case is pivoted counter-clockwise with respect to a reference line running parallel to the center axis 5. As a result, the configuration here has a negative axial rake angle β.

In the embodiment of the drill bit 1 illustrated in FIGS. 1 and 2, the chip flutes 27 and 29 have a helical design, and form a helix angle γ with the center axis 5, as can be seen in FIG. 2.

Figure 3:
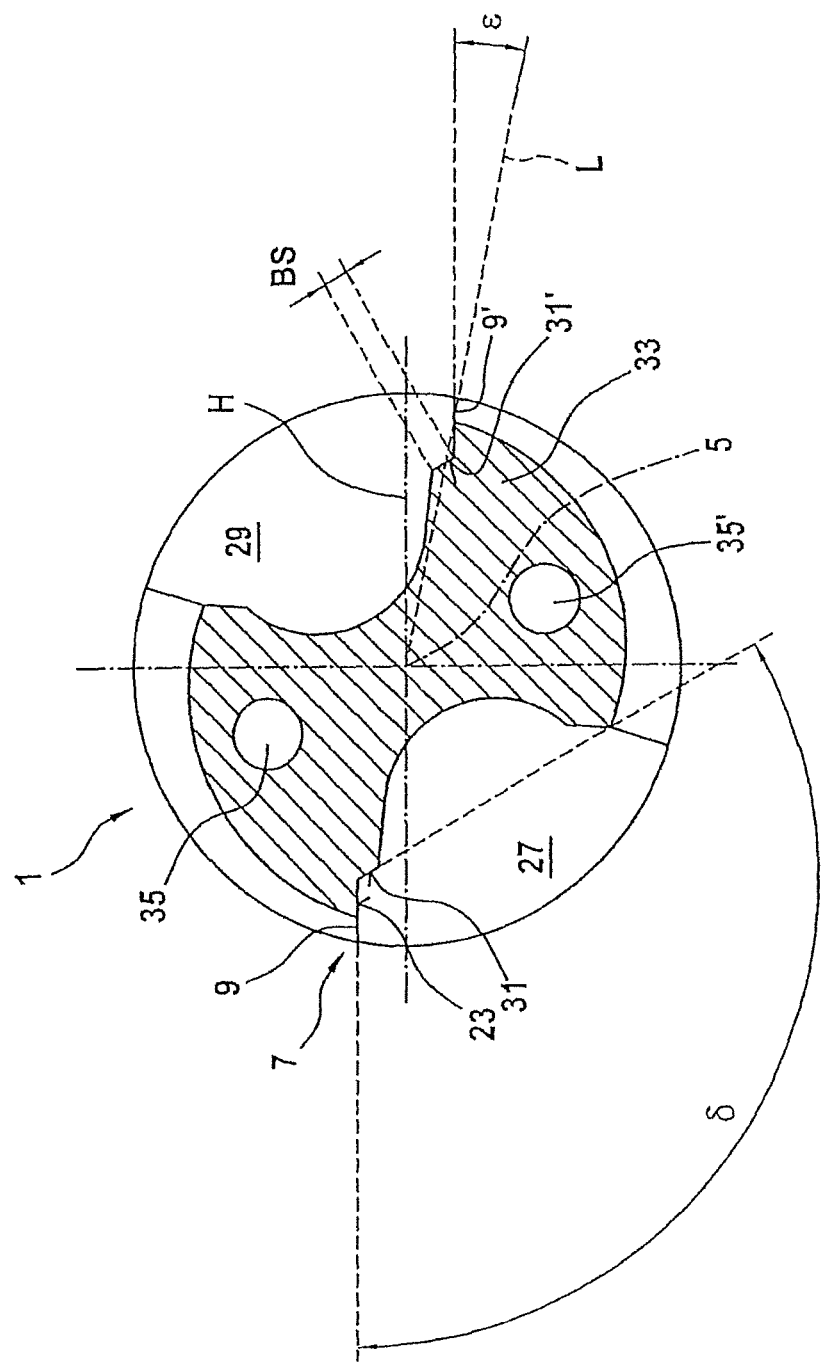
FIG. 3 shows the drill bit according to FIGS. 1 and 2 in cross-section, along the line III-III depicted in FIG. 2.

FIG. 3 shows the drill bit 1 according to FIG. 2 in cross-section, wherein the sectioning plane thereof runs along the line depicted in FIG. 2. Identical and functionally-identical parts are indicated by the same reference numbers, such that attention can hereby be directed to the above description referring to the figures in order to avoid repetition.

The first cutting edge 9 of the first cutting region 7 can be seen at left in the cutaway view. Diametrically opposite is the first cutting edge 9' of the first cutting region 7', with an identical design.

The cutting face 23 functionally assigned to the first cutting edge 9 adjoins the first cutting edge 9—running into the plane of the image in FIG. 3—running parallel to an imaginary horizontal diameter line H in the cutaway view illustrated here. Said cutting face transitions into a shoulder surface 31, forming an obtuse angle δ with the cutting face 23—termed the shoulder angle. A chip shaping stage is formed by the cutting face 23 and the adjoining shoulder surface 31, wherein defined, short chips are created by the same during the machining of a work piece. The width BS of the shoulder surface 31' is indicated for the region of the cutting edge 9' in FIG. 3 by means of two reference lines. Because the first cutting edges 9 and 9', as well as the associated surfaces, are identical, the width BS of the shoulder surface 31 is identical to the shoulder surface 31'. FIG. 3 also illustrates the chip flutes 27 and 29.

It can be seen in FIG. 3—in an explanation referring here to the first cutting edge 9'—that the cutting face 23 forms an angle—indicated as the radial rake angle ε—together with a radial reference line L, the same proceeding from the center axis 5 running perpendicular to the plane of the image in FIG. 3 and intersecting the tip of the cutting edge 9' at the furthest-outward radial position. The cutting face 23 of the first cutting edge 9 is preferably arranged in such a manner that a positive radial rake angle ε results.

FIG. 3 also illustrates two cooling means/lubricant channels 35 and 35' which run through the base body 33 of the drill bit 1, and which end at associated openings 21 in the end face 15 of the drill bit 1, as can be seen in FIGS. 1 and 2.

Figure 4:
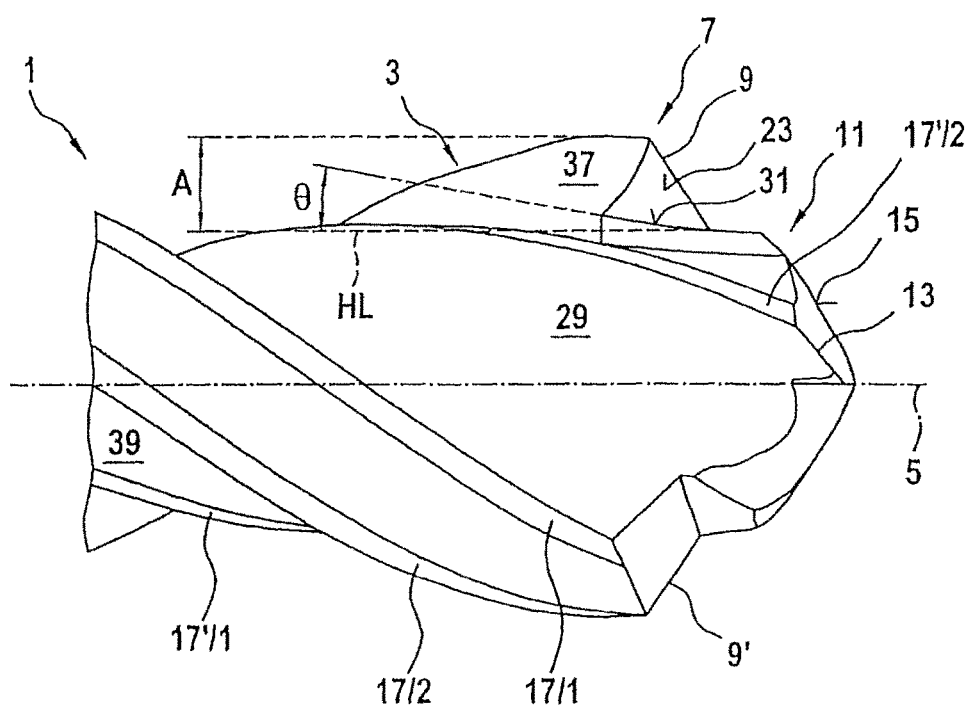
FIG. 4 shows a second embodiment of the drill bit in a side view.

FIG. 4 shows a side view of a second embodiment of a drill bit, wherein identical and functionally-identical parts are given the same reference numbers, such that attention is hereby directed to the description referring to FIGS. 1 to 3 above.

The second embodiment of the drill bit 1 has, according to FIG. 4, a tool shank 3, which is broken off at left. As such, there can be a holder shaft or the like configured along the further extension of the drill bit 1, to exert a torque on the drill bit 1.

The drill bit 1 has a first cutting region 7 and a second cutting region 1 which is arranged at a distance therefrom axially—measured along the center axis 5. Chips milled out by the first cutting edge 9 of the first cutting region 7 are removed via an associated third chip flute 37. The chips milled out by the second cutting edge 13 of the second cutting region 11 flow out of the bore hole and into the associated chip flute 29. Accordingly, chips milled out by the first cutting edge 9' of the first cutting region 7' are removed via an associated fourth chip flute 39, which is covered in FIG. 4, while chips milled out by the second cutting edge 13' of the second cutting region 11 flow away via the chip flute 29 which is covered in the drawing.

The chips of the two cutting regions 7, 11 can therefore not mutually interfere with each other.

Therefore, it is an essential feature of this embodiment that separate chip flutes 37, 39, and 27, 29 are functionally assigned to the first cutting region 7 and the second cutting region 11.

FIG. 4 also shows that the drill bit 1 illustrated in this case has multiple guide bevels—particularly two guide bevels 17/1 and 17/2 facing the observer, and also corresponding guide bevels 17'/1 and 17'/2 on the reverse side of the drill bit 1, facing away from the observer in part not visible in this case. As such, there are four guide strips included in this embodiment.

In the embodiment illustrated in FIG. 4 as well, the drill bit 1 has a second cutting region 11 with at least one second cutting edge 13.

The embodiment illustrated here has—as in the embodiment described above, a cutting edge 9' opposite the first cutting edge 9, and a cutting edge which is opposite the second cutting edge 13, which is covered. Therefore, the first and second cutting edges, positioned opposite each other in pairs, are configured in the first and second cutting regions.

A further difference between the embodiment illustrated in FIG. 4 and the embodiment described above is that the axial distance—measured, that is, along the center axis 5—is smaller between the first cutting region 7 and the second cutting region 11.

FIG. 4 illustrates, in addition to the cutting face 23, the shoulder surface 31, which forms a chip shaping stage together with the shoulder face 23, said chip shaping stage being functionally assigned to the first cutting edge 9. A corresponding chip shaping stage is configured in the opposite first cutting edge 9'.

The shoulder surface 31 preferably forms an angle θ with an imaginary horizontal line, opening to the left in FIG. 4—as viewed from the end face. In other words, the shoulder surface 31 runs at an acute angle of inclination θ with respect to the center axis 5. This design ensures that chips milled out by the first cutting edge 9 are guided and deflected in the direction of the center axis 5.

This slope of the shoulder surface 31 is preferably present in the first embodiment as well, the same having been explained with reference to FIGS. 1 to 3.

The distance between the radially outward edge of the first cutting edge 9 (at top in FIG. 4) and a horizontal reference line HL—measured radially from the center axis 5, is defined as the radial depth of cut A. This is also indicated in FIG. 1.

The radial depth of cut A indicates the extent to which a bore hole machined or produced by means of the second cutting region 11 is enlarged by machining of the bore hole by means of the first cutting region 7.

In the embodiment illustrated in FIG. 4 as well, the second cutting region 11 on the end face 15 of the drill bit 1 can be designed in such a manner that the drill bit 1 can be used to drill in solid material. However, it can also be contemplated that the second cutting region 11 is designed in such a manner that it is used for the purpose of counter boring an existing bore hole. As such, the existing bore hole is counter bored by means of the second cutting region 11.

If the drill bit 1 according to FIGS. 1 to 3 and according to FIG. 4 is guided completely through a work piece being machined, the second cutting region 11 and the first cutting region 7 function as counter borers. If the drill bit 1 is only inserted into the work piece along a shorter path, a bore hole is produced and/or enlarged by the second cutting region 11, and the same is further enlarged by the second cutting region 11 to the extent of the radial depth of cut A. A stepped bore hole results in this case.

As such, it is possible to use the drill bit 1 described here as a stepped bore or counterbore tool.

Particularly when long-chipping materials are machined, the chips milled out from the material are broken by the chip shaping stage implemented by the cutting face 23 and the adjacent shoulder surface 31, such that defined, short chips are created which can be removed as such via the chip flutes 27 and 29 of the drill bit 1.

It is essential that the drill bit 1 can also be designed exclusively with a first cutting region 7 and with at least one associated first cutting edge 9 of a first cutting region 7, wherein the second cutting region 11 with the at least one second cutting edge 13 is entirely dispensed with. In this case, the resulting end face of the drill bit 1 can be designed in such a manner that the first cutting region 7 enlarges an existing bore hole, thereby forming a counterbore step, or in such a manner that the drill bit 1 can drill into solid material.

However, it can also be contemplated that such a drill bit, having only the first cutting region 7, and no second cutting region 11, is used in the machining of a work piece in such a manner that it is not guided completely through the same, but rather only enlarges a bore hole existing in a defined area. When the counter boring process is ended, a step is created which has an internal diameter which is larger than the bore hole being machined. As such, a stepped bore hole is created.

Even in a configuration which dispenses with the second cutting region 11, the chip shaping stage formed by the cutting face 23 of the first cutting edge 9 and the adjacent shoulder surface 31 is of decisive significance, because chips milled out in the first cutting region 7 are broken by the same—even, and particularly, when long-chipping materials are machined—such that the chips can be directly removed via the chip flutes 27 and 29.

The chip shaping stage is decisive for the positive properties of the drill bit 1 as illustrated in FIGS. 1 to 4, or of a drill bit without a second cutting region, wherein the shoulder surface 31 of said chip shaping stage runs at an acute angle of inclination θ with respect to the center axis 5 of the drill bit 1, such that chips removed by the at least one first cutting edge 9, and/or also from an identical first cutting edge 9' opposite thereto, are deflected in the direction of the center axis 5.

As regards the at least one first cutting edge 9, the configuration is retained in which the same has a first cutting segment oriented in the direction of advancement, said cutting segment being termed the major cutting edge, and a second cutting segment which is situated on the peripheral surface of the drill bit 1. It is particularly preferred that the rake angle of the cutting face 23, as measured orthogonal to this major cutting edge of the first cutting edge 9, is positive, because in this way the cutting forces are reduced and good surface properties are created for the bore hole following machining.

FIG. 3 also shows that the radial rake angle ε is preferably positive. Particularly good machining results have been demonstrated when the radial rake angle ε is at least 10°.

Good machining properties, in the use of the drill bit 1 described here, have particularly been established when the width BS of the shoulder surface 31, as illustrated in FIG. 3, constitutes at least 25% of the radial depth of cut A which can be seen in FIGS. 1 and 4.

The shoulder angle δ formed between the cutting face 23 and the shoulder surface 31 is chosen such that it is greater than 100°, on the one hand, while on the other hand it is smaller than the difference between 180° and the countersink angle α. That is, the shoulder surface δ is preferably selected such that the following is true: 100°≤δ≤180°.

In the drill bit 1 according to the invention, as illustrated in FIGS. 1 to 4, or in a drill bit without the second cutting region 11, the following has been demonstrated for a countersink angle α less than 90°: chips which are milled out by the at least one first cutting edge 9 are conveyed more forcefully in the direction of the center axis 5 in proportion to how negative the axial rake angle β is, and how positive the radial rake angle ε is.

One particularly preferred embodiment, a shoulder angle δ of 135° provides for a countersink angle α of 45°, a radial rake angle ε of +15° and an axial rake angle β of −2°. In this way, it is possible to create particularly short chips, even when long-chipping materials are machined using the drill bit claimed herein. A drill bit of the type claimed herein is particularly preferably realized with a shoulder surface 31 having an angle of inclination θ as illustrated in FIG. 4 in the range between −10°≤θ≤+10°. It is particularly preferred that an angle of inclination θ is in the range between −5°≤θ≤+5°.

Shoulder angles δ in a range between 100°≤δ≤160° have also proven particularly favorable.

In combination with the shoulder angle θ, the following relationship is preferably observed: the smaller the countersink angle α is, the greater the shoulder angle δ should be, such that long chips are reliably prevented.

The chip shaping stage described herein, formed by the cutting face 23 and by the shoulder surface 31, also leads—and particularly in the machining of long-chipping materials—to the deflection of the chips milled out by the first cutting region 7 and/or the at least one first cutting edge 9 in the direction of the center axis 5 in such a manner that short, defined chips are created, and elongated chips which could wrap around the drill bit 1 are not created.

This advantage is therefore not only realized in the embodiments of a drill bit 1 illustrated in the FIGS. 1 to 3, but also in a drill bit according to FIG. 4, which is modified compared to any one of these illustrations, and which has only one single cutting region—particularly the first cutting region 7 with at least one cutting edge 9. In the embodiments of a drill bit 1 described in reference to FIGS. 1 to 4, the chip shaping stage explained herein has particularly advantageous effects, because—particularly in the counter boring of, and the production of stepped bore holes in, work pieces made of long-chipping materials—long chips are typically formed, and frequently tangle into a compact ball. This leads to the at least one first cutting edge breaking off, or even to the drill bit 1 breaking. This disadvantage is reliably avoided by the chip shaping stage explained here.

The invention claimed is:
1. A drill bit comprising:
a tool shank;
a center axis;
a first cutting region with at least one geometrically defined first cutting edge having a cutting face arranged at a radial distance from the center axis of the drill bit, the first cutting edge forming a countersink angle with the center axis, the cutting face runs at a radial rake angle with respect to an imaginary radial line which cuts the first cutting edge, the first cutting edge functionally assigned to the cutting face, the radial rake angle being positive; and a chip shaping stage is functionally assigned to the first cutting edge, the chip shaping stage formed by the cutting face of the first cutting edge and by a shoulder surface adjoining the cutting face, a shoulder angle formed between the shoulder surface and the cutting face, wherein the shoulder angle is greater than 90°, the radial rake angle is positive, the cutting face of the chip shaping stage is arranged with a slope forming an axial rake angle with respect to the center axis, and the axial rake angle is negative.

2. The drill bit of claim 1, wherein the shoulder angle is greater than 100°.

3. The drill bit according to claim 1, wherein an angle of inclination of the shoulder surface of the chip shaping stage is configured to have a value greater than or equal to −10° and less than or equal to +10°.

4. The drill bit according to claim 1, wherein an angle of inclination of the shoulder surface of the chip shaping stage is configured to have a value in a range from greater than or equal to −5° to less than or equal to +5°.

5. The drill bit according to claim 1, wherein the first cutting region has a slope which forms a countersink angle with respect to the center axis, the countersink angle being less than 45°.

6. The drill bit according to claim 1, wherein the shoulder angle is configured in a range from greater than or equal to 100° to less than or equal to 160°.

7. The drill bit according to claim 1, wherein the shoulder angle is smaller than a difference between 180° and the countersink angle.

8. The drill bit according to claim 1, wherein the radial rake angle is at least 10°.

9. The drill bit according to claim 1, wherein a width of the shoulder surface defines at least 25% of a radial depth of cut (A).

10. The drill bit according to claim 1, wherein the shoulder angle is greater than or equal to 100° and less than or equal to 180°.

11. The drill bit according to claim 1, further comprising a second cutting region with at least one geometrically defined second cutting edge having a cutting face, arranged at a radial distance from the center axis, the second cutting region arranged on an end face of the drill bit, and the first cutting region arranged at a distance therefrom axially along the center axis, wherein the radial distance of the second cutting edge from the center axis is smaller than the radial distance of the first cutting edge from the center axis.

12. The drill bit according to claim 11, wherein a first chip flute and a second chip flute are included, and wherein chips milled out by the first cutting edge of the first cutting region, and chips milled out by the second cutting edge of the second cutting region, are removed by the first chip flute, and chips from the first cutting edge, as well as chips from the second cutting edge, are removed by the second chip flute.

13. The drill bit according to claim 11, further comprising first chip and second chip flutes functionally assigned to the second cutting region and third and fourth chip flutes functionally assigned to the first cutting region, wherein chips milled out by the first cutting region, and chips milled out by the second cutting region are removed in separate chip flutes.

14. A method of using the drill bit according to claim 1, the method comprising:

forming a bore selected from a group consisting of a stepped bore and a counterbore.

15. A method of using the drill bit according to claim 13, the method comprising:

forming a bore selected from a group consisting of a stepped bore and a counterbore.

16. The drill bit according to claim 1, wherein a borderline between the shoulder surface and the cutting face extends substantially parallel to the center axis and terminates in a rearward direction at a chip flute.

* * * * *